United States Patent
Kitson et al.

(10) Patent No.: US 12,026,363 B2
(45) Date of Patent: Jul. 2, 2024

(54) PRE-SAVED GROUPS IN A MEDIA PLAYBACK SYSTEM

(71) Applicant: Sonos, Inc., Santa Barbara, CA (US)

(72) Inventors: Ryan Kitson, Santa Barbara, CA (US); Michael Nuzzolo, Cambridge, MA (US); Brandon Lynne, Santa Barbara, CA (US); G. Oliver Young, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/050,629

(22) Filed: Oct. 28, 2022

(65) Prior Publication Data

US 2024/0143153 A1    May 2, 2024

Related U.S. Application Data

(63) Continuation of application No. 16/435,556, filed on Jun. 9, 2019, now abandoned, which is a (Continued)

(51) Int. Cl.
*G06F 3/0482* (2013.01)
*G06F 3/04847* (2022.01)
*G06F 3/0488* (2022.01)

(52) U.S. Cl.
CPC ........ *G06F 3/04847* (2013.01); *G06F 3/0482* (2013.01); *G06F 3/0488* (2013.01)

(58) Field of Classification Search
CPC .................................................. G06F 3/048–05
See application file for complete search history.

(56) References Cited

U.S. PATENT DOCUMENTS

| 5,440,644 A | 8/1995 | Farinelli et al. |
|---|---|---|
| 5,761,320 A | 6/1998 | Farinelli et al. |

(Continued)

FOREIGN PATENT DOCUMENTS

| CA | 2832542 A1 | 10/2012 |
|---|---|---|
| EP | 1389853 A1 | 2/2004 |

(Continued)

OTHER PUBLICATIONS

Where Is That Setting?, "Sonos: How to create speaker groups", published Jul. 16, 2020, available at <<https://www.youtube.com/watch?v=Wbys7Zy5ZJM>>, 9 pages (Year: 2020).*

(Continued)

*Primary Examiner* — Daniel Rodriguez
(74) *Attorney, Agent, or Firm* — Fortem IP LLP

(57) ABSTRACT

Example techniques involve selection of playback devices within a media playback system for outputting a media stream based on user input. An example implementation involves a controller causing a plurality of first representations of at least some of a plurality of playback devices to be displayed on a first portion of a display. The controller causes a plurality of second representations of at least some of one or more groups playback devices to be displayed on a second portion of the display, each group having at least two associated playback devices of the plurality of playback devices. The controller receives an input indicative of a particular group of the one or more groups and adjusts a selected status of the particular group. The controller also determines which playback devices are associated with the particular group, and adjusts a selected status of the playback devices that associated with the particular group.

18 Claims, 11 Drawing Sheets

Related U.S. Application Data continuation-in-part of application No. 29/672,604, filed on Dec. 6, 2018, now Pat. No. Des. 963,685, which is a continuation-in-part of application No. 16/212,437, filed on Dec. 6, 2018, now abandoned.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1* | 8/2009 | Lambourne ............ G06F 3/165 700/94 |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,290,603 | B1* | 10/2012 | Lambourne ............ G06F 3/162 381/104 |
| 8,483,853 | B1* | 7/2013 | Lambourne ............ H04H 60/80 709/217 |
| 8,942,252 | B2 | 1/2015 | Balassanian et al. |
| 9,052,810 | B2* | 6/2015 | Reimann ............ G06F 3/04847 |
| 9,164,532 | B2* | 10/2015 | Millington .......... H04L 65/1094 |
| 9,202,509 | B2* | 12/2015 | Kallai ................ H04N 21/4307 |
| 9,483,230 | B1* | 11/2016 | Bates ................ G06F 3/04847 |
| 9,860,589 | B2* | 1/2018 | Coburn, IV ........ H04L 65/1101 |
| 10,452,345 | B1* | 10/2019 | Coburn, IV .......... G06F 3/0482 |
| 10,623,844 | B2* | 4/2020 | Clayton .................. G06F 3/165 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2010/0299639 | A1* | 11/2010 | Ramsay ................ G06F 3/0486 715/835 |
| 2013/0254663 | A1* | 9/2013 | Bates ........................ G06F 3/16 715/716 |
| 2013/0331970 | A1* | 12/2013 | Beckhardt .......... H04N 21/8113 700/94 |
| 2014/0176299 | A1* | 6/2014 | Kumar .................... G06F 3/165 340/4.42 |
| 2014/0181655 | A1* | 6/2014 | Kumar .................... G06F 3/0488 715/716 |
| 2014/0181656 | A1* | 6/2014 | Kumar ................ H04L 12/6418 715/716 |
| 2014/0310597 | A1* | 10/2014 | Triplett ............... H04L 12/2812 715/716 |
| 2015/0253960 | A1* | 9/2015 | Lin ........................ G06F 16/639 715/733 |
| 2015/0261410 | A1* | 9/2015 | Kumar .................... H04W 4/08 715/716 |
| 2015/0286360 | A1* | 10/2015 | Wachter ................ G06F 3/0412 345/173 |
| 2015/0350031 | A1* | 12/2015 | Burks ................ G06F 3/04842 715/736 |
| 2016/0026429 | A1* | 1/2016 | Triplett .................. G06F 3/165 715/716 |
| 2016/0246567 | A1* | 8/2016 | Fullerton ................ G06F 3/165 |
| 2016/0248840 | A1 | 8/2016 | Bockhold et al. |
| 2016/0299736 | A1 | 10/2016 | Bates et al. |
| 2017/0251314 | A1* | 8/2017 | Pye, Jr. ............... G06F 3/04817 |
| 2017/0269900 | A1 | 9/2017 | Triplett |
| 2018/0107446 | A1 | 4/2018 | Wilberding et al. |
| 2018/0233137 | A1 | 8/2018 | Torok et al. |
| 2018/0335903 | A1* | 11/2018 | Coffman ............. G06F 3/04847 |
| 2020/0069138 | A1* | 3/2020 | O'Dea ................ G05D 1/0274 |
| 2020/0280800 | A1* | 9/2020 | Wilberding ............ H04R 1/403 |
| 2021/0068173 | A1* | 3/2021 | Yore .................. G06F 3/04847 |

FOREIGN PATENT DOCUMENTS

| | | |
|---|---|---|
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.
Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report dated Aug. 17, 2022, issued in connection with Canadian Application No. 3122268, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jun. 20, 2022, issued in connection with U.S. Appl. No. 16/435,556, filed Jun. 9, 2019, 12 pages.
Final Office Action dated Jul. 8, 2021, issued in connection with U.S. Appl. No. 16/435,556, filed Jun. 9, 2019, 12 pages.
International Bureau, International Preliminary Report on Patentability and Written Opinion, dated Jun. 8, 2021, issued in connection with International Application No. PCT/US2019/065039, filed on Dec. 6, 2019, 9 pages.
International Bureau, International Search Report and Written Opinion dated Apr. 3, 2020, issued in connection with International Application No. PCT/US2019/065039, filed on Dec. 6, 2019, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Feb. 9, 2023, issued in connection with U.S. Appl. No. 18/050,629, filed Oct. 28, 2022, 26 pages.
Non-Final Office Action dated Mar. 2, 2020, issued in connection with U.S. Appl. No. 16/212,437, filed Dec. 6, 2018, 14 pages.
Non-Final Office Action dated Nov. 2, 2020, issued in connection with U.S. Appl. No. 16/435,556, filed Jun. 9, 2019, 10 pages.
Non-Final Office Action dated Dec. 9, 2021, issued in connection with U.S. Appl. No. 16/435,556, filed Jun. 9, 2019, 11 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.

(56) References Cited

OTHER PUBLICATIONS

United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Where Is That Setting?, Sonos: How to create speaker groups. YouTube, Jun. 16, 2020, 9 pages [online], [retrieved on Feb. 9, 2023]. Retrieved from the Internet: URL: https://www.youtube.com/ watch?v=Wbys7Zy5ZJM.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

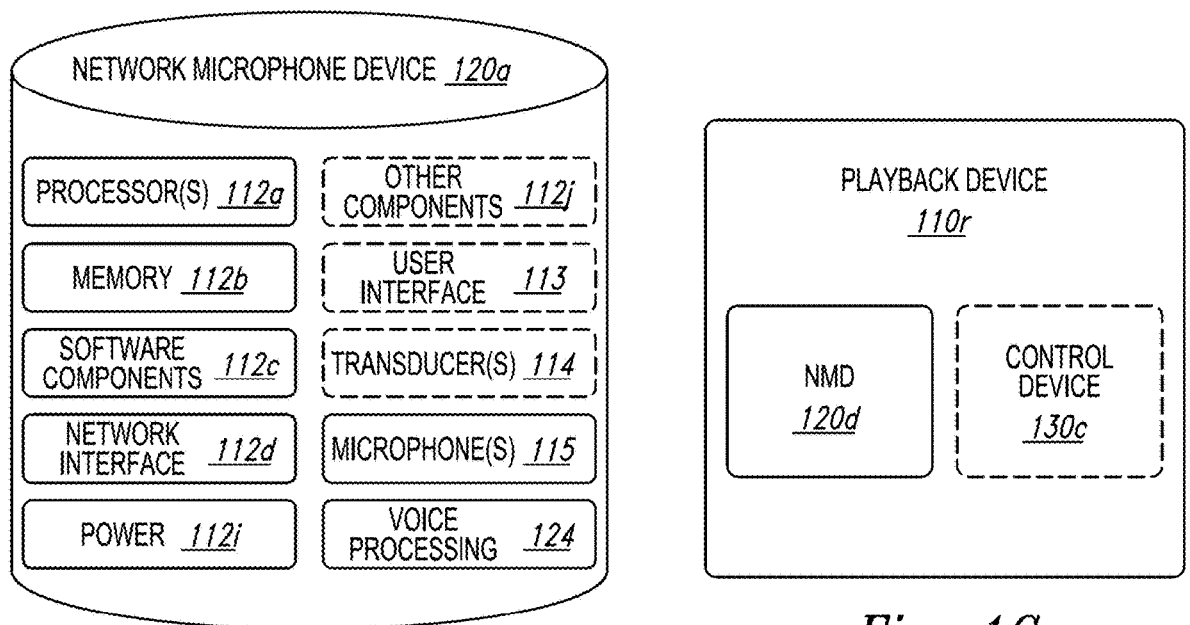
*Fig. 1F*
*Fig. 1G*
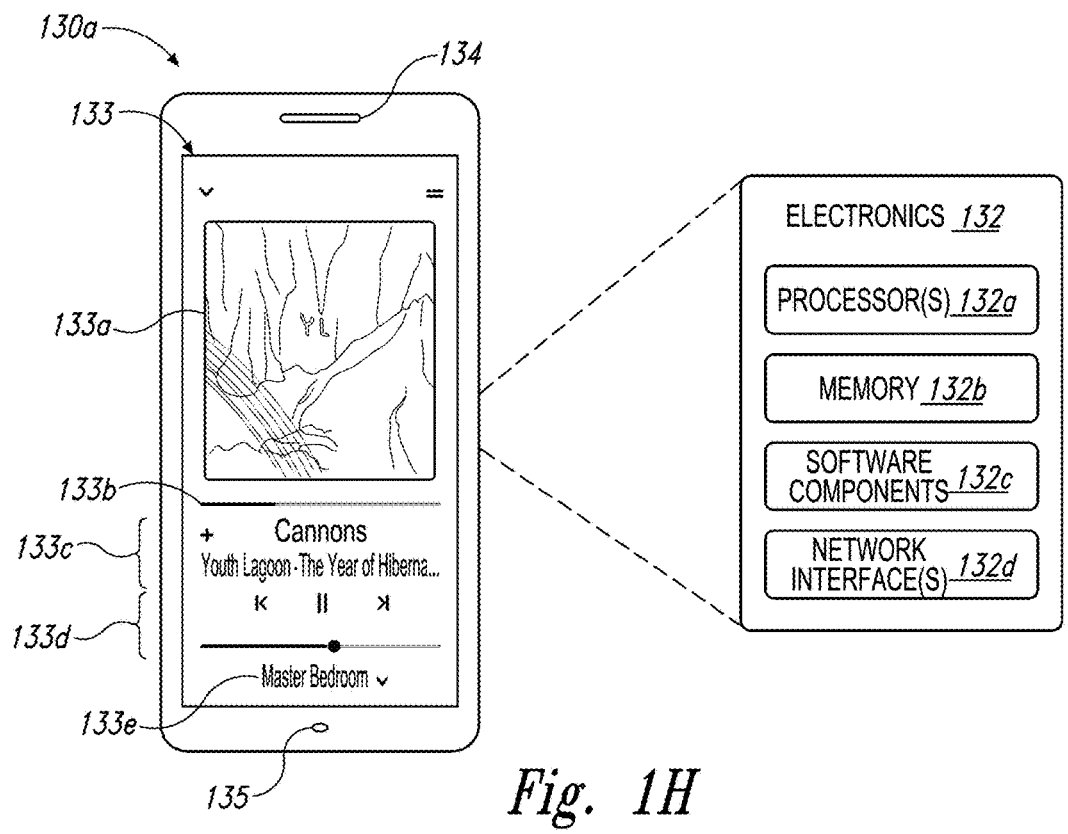
*Fig. 1H*

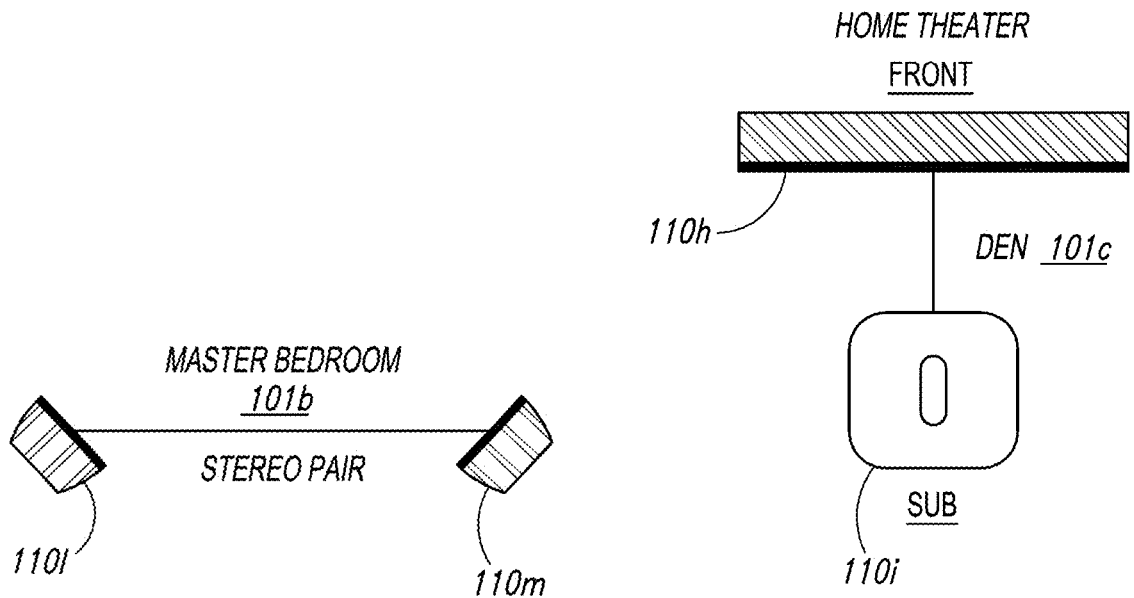
Fig. 1I
Fig. 1J
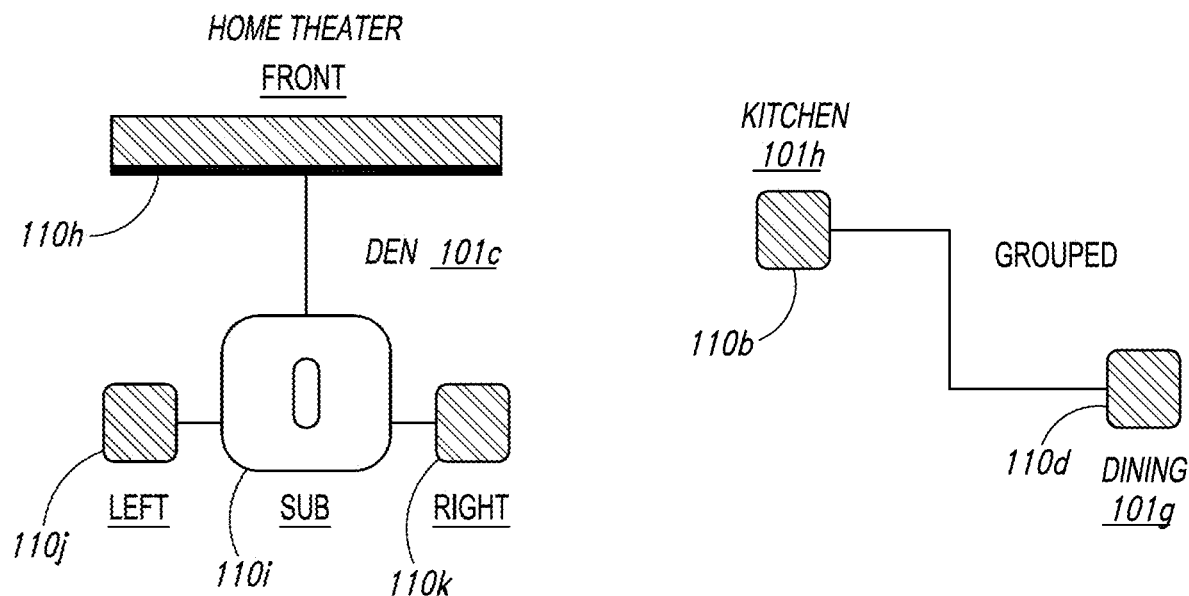
Fig. 1K
Fig. 1L

PRE-SAVED GROUPS IN A MEDIA PLAYBACK SYSTEM

CROSS REFERENCE TO RELATED APPLICATIONS

This application claims priority under 35 U.S.C. § 120 to, and is a continuation of, U.S. patent application Ser. No. 16/435,556, filed Jun. 9, 2019, entitled "Selection of Playback Devices," which is incorporated herein by reference in its entirety U.S. patent application Ser. No. 16/435,556 claims priority under 35 U.S.C. § 120 to, and is a continuation-in-part of, U.S. Design patent application No 29/672,604, filed on Dec. 6, 2018, entitled "Display Screen or Portion Thereof with Graphical User Interface for Media Playback Control," and issued as U.S. Design Pat. No. D963,685 on Sep. 13, 2022, which is incorporated herein by reference in its entirety.

U.S. Design patent application No 29/672,604 claims priority under 35 U.S.C. § 120 to, and is a continuation-in-part of, U.S. non-provisional patent application Ser. No. 16/212,437, filed on Dec. 6, 2018, entitled "Selection of Playback Devices," now abandoned, which is incorporated herein by reference in its entirety

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIGS. 1I, 1J, 1K, and 1L are schematic diagrams of corresponding media playback system zones.

Figure 1A:
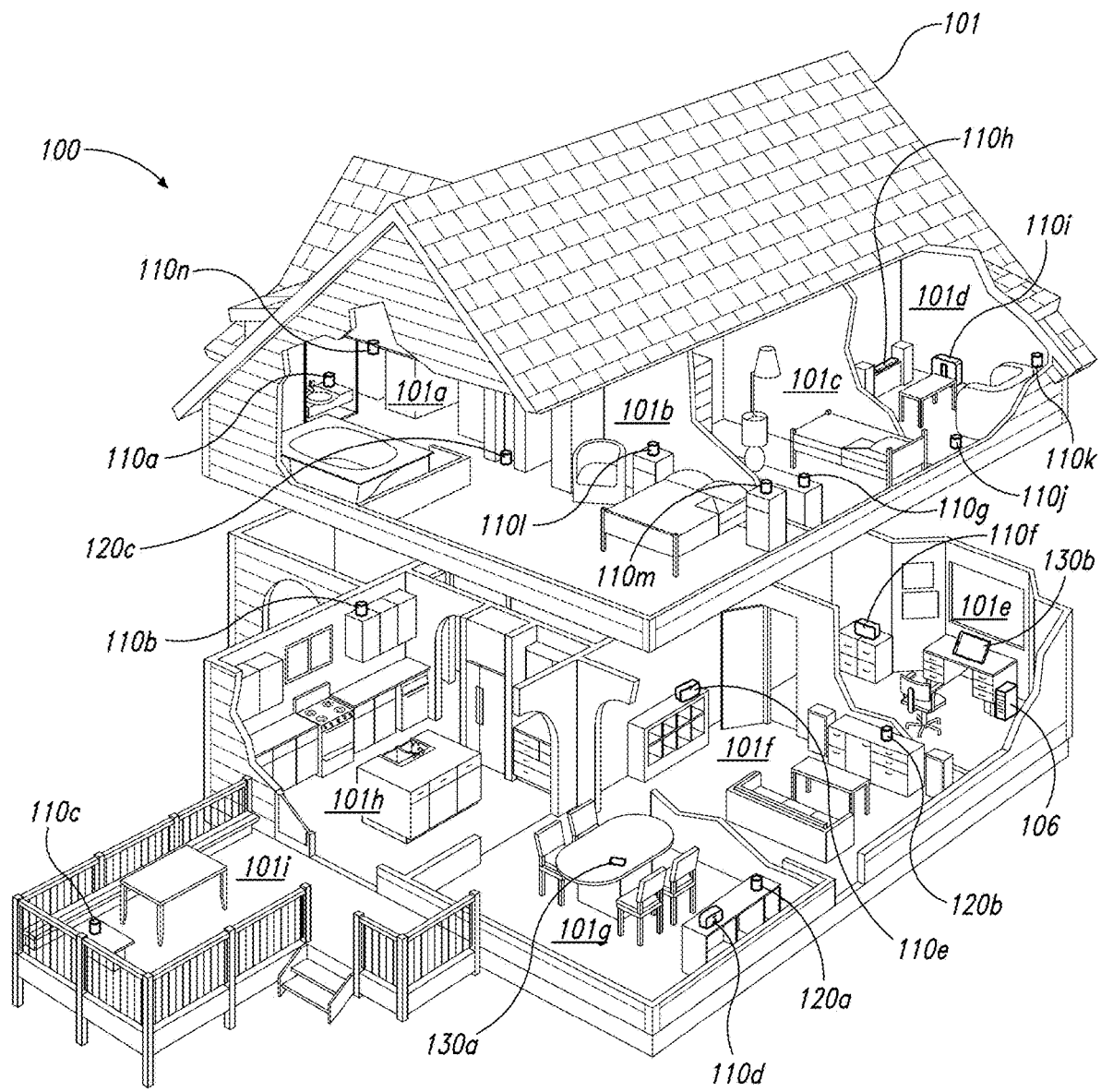
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to the selection of playback devices within a media playback system for outputting a media stream, based on user input on a controller device. Representations of saved groups of playback devices and individual playback devices are displayed simultaneously. Playback devices may be selected by an input indicating a selection of a group of playback devices or individual playback devices. Any changes to the selected status of a playback device are reflected in representations of both the individual playback devices and representations of at least one saved group of playback devices on a display.

In this way a user can select desired playback devices with increased efficiency. For example, a user has available both individual and group representations to adjust the selection. As both individual devices and groups of devices are represented on a display simultaneously, and both reflect a selected status, users can select devices with relatively few steps and in a simple manner. Efficient use may also be made of limited screen space.

In some embodiments, a method comprises, at a controller device: retrieving data indicative of a plurality of playback devices, causing a plurality of first representations of at least some of the plurality of playback devices to be displayed on a first portion of a display of the controller device; retrieving data indicative of one or more groups of playback devices, each group having at least two associated playback devices of the plurality of playback devices; and causing a plurality of second representations of at least some of the one or more groups to be displayed on a second portion of the display. In response to the receipt of an input indicative of a particular group of the one or more groups, the method adjusts a selected status of the particular group; determines playback devices of the plurality of playback devices which are associated with the particular group; adjusts a selected status of the playback devices that are determined to be associated with the particular group; changes the second representation of the particular group on the second portion of the display based on the adjusted selected status of the particular group; and changes the first representation of the playback devices that are determined to be associated with the particular group on the first portion of the display based on the adjusted selected status of the playback devices.

The method may comprise determining that none of the playback devices that are determined to be associated with the particular group have a first representation visible on the first portion of the display. The changing a representation of the playback devices may then comprise causing at least one first representation of a playback device associated with the particular group to be visible on the first portion of the display.

The method may further comprise, after the adjusting a selected status of playback devices associated with the particular group, adjusting a selected status of a further group of playback devices based on the adjusted status of the playback devices.

The method may further comprise, responsive to receipt of an input indicative of a particular playback device: adjusting a selected status of the particular playback device; changing the first representation of the particular playback device on the first portion of the display based on the selected status of the particular playback device; determining at least one of the one or more groups which is associated the particular playback device; adjusting a selected status of the determined at least one of the one or more groups, based on the selected status of the particular playback device; and changing the second representation of the at least one of the one or more groups on the second portion of the display based on the selected status of the at least one of the one or more groups.

The method may further comprise causing reproduction of media according to the selected status of playback devices.

The data indicative of the one or more groups may be retrieved from a storage of the controller device. The data indicative of the one or more groups may be retrieved from another device, separate from the controller.

The data indicative of the one or more groups may be associated with a user account.

The method may further comprise storing a group based on user-selected playback devices before the step of retrieving data indicative of one or more groups of playback devices.

The method may further comprise determining a display name based on the selected status of the plurality of playback devices and the one or more groups.

The method may be used with a controller which has a diagonal dimension less than or equal to about 18 cm.

In a further embodiment, a method comprises, at a controller device: retrieving data indicative of a plurality of playback devices, causing a plurality of first representations of at least some of the plurality of playback devices to be displayed on a first portion of a display of the controller device; retrieving data indicative of one or more groups of playback devices, each group having at least two associated playback devices of the plurality of playback devices; and causing a plurality of second representations of at least some of the one or more groups to be displayed on a second portion of the display. Responsive to receipt of an input indicative of a particular playback device, the method comprises: adjusting a selected status of the particular playback device; changing the first representation of the particular playback device on the first portion of the display based on the selected status of the particular playback device; determining at least one of the one or more groups which is associated the particular playback device; adjusting a selected status of the determined at least one of the one or more groups, based on the selected status of the particular playback device; and changing the second representation of the at least one of the one or more groups on the second portion of the display based on the selected status of the at least one of the one or more groups.

In another embodiment, a controller for a media playback system comprising a plurality of playback devices is provided. The controller comprises: a display; a human interface device configured to allow user input to be received; storage comprising non-transitory computer readable instructions for execution by the processor; and a processor. The computer-readable instructions, when executed by the processor, instruct the processor to: retrieve data indicative of a plurality of playback devices; cause a plurality of first representations of at least some of the plurality of playback devices to be displayed on a first portion of a display of the controller device; retrieve data indicative of one or more groups of playback devices, each group having at least two associated playback devices of the plurality of playback devices; and cause a plurality of second representations of at least some of the one or more groups to be displayed on a second portion of the display. In response to receipt of an input indicative of a particular group of the one or more groups, the computer-readable instructions instruct the process to: adjust a selected status of the particular group; determine playback devices of the plurality of playback devices which are associated with the particular group; and adjust a selected status of the playback devices that are determined to be associated with the particular group. The second representation of the particular group on the second portion of the display is also changed based on the adjusted selected status of the particular group; as is the first representation of the playback devices that are determined to be associated with the particular group on the first portion of the display based on the adjusted selected status of the playback devices.

The computer-readable instructions may also instruct the processor to carry out some, or all, of the steps discussed above regarding the method.

The display of the controller may have a diagonal dimension which is less than or equal to about 18 cm.

In another embodiment, a non-transitory computer-readable medium has computer program instructions embodied thereon. The computer program instructions, when executed by a processor of a controller, instruct the controller to retrieve data indicative of a plurality of playback devices; cause a plurality of first representations of at least some of the plurality of playback devices to be displayed on a first portion of a display of the controller device; retrieve data indicative of one or more groups of playback devices, each group having at least two associated playback devices of the plurality of playback devices; and cause a plurality of second representations of at least some of the one or more groups to be displayed on a second portion of the display. In response to the receipt of an input indicative of a particular group of the one or more groups the instructions, when executed by a processor of the controller, cause the processor to: adjust a selected status of the particular group; determine playback devices of the plurality of playback devices which are associated with the particular group; adjust a selected status of the playback devices that are determined to be associated with the particular group; change the second representation of the particular group on the second portion of the display based on the adjusted selected status of the particular group; change the first representation of the playback devices that are determined to be associated with the particular group on the first portion of the display based on the adjusted selected status of the playback devices; and cause reproduction of media according to the selected status of playback devices.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1M.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
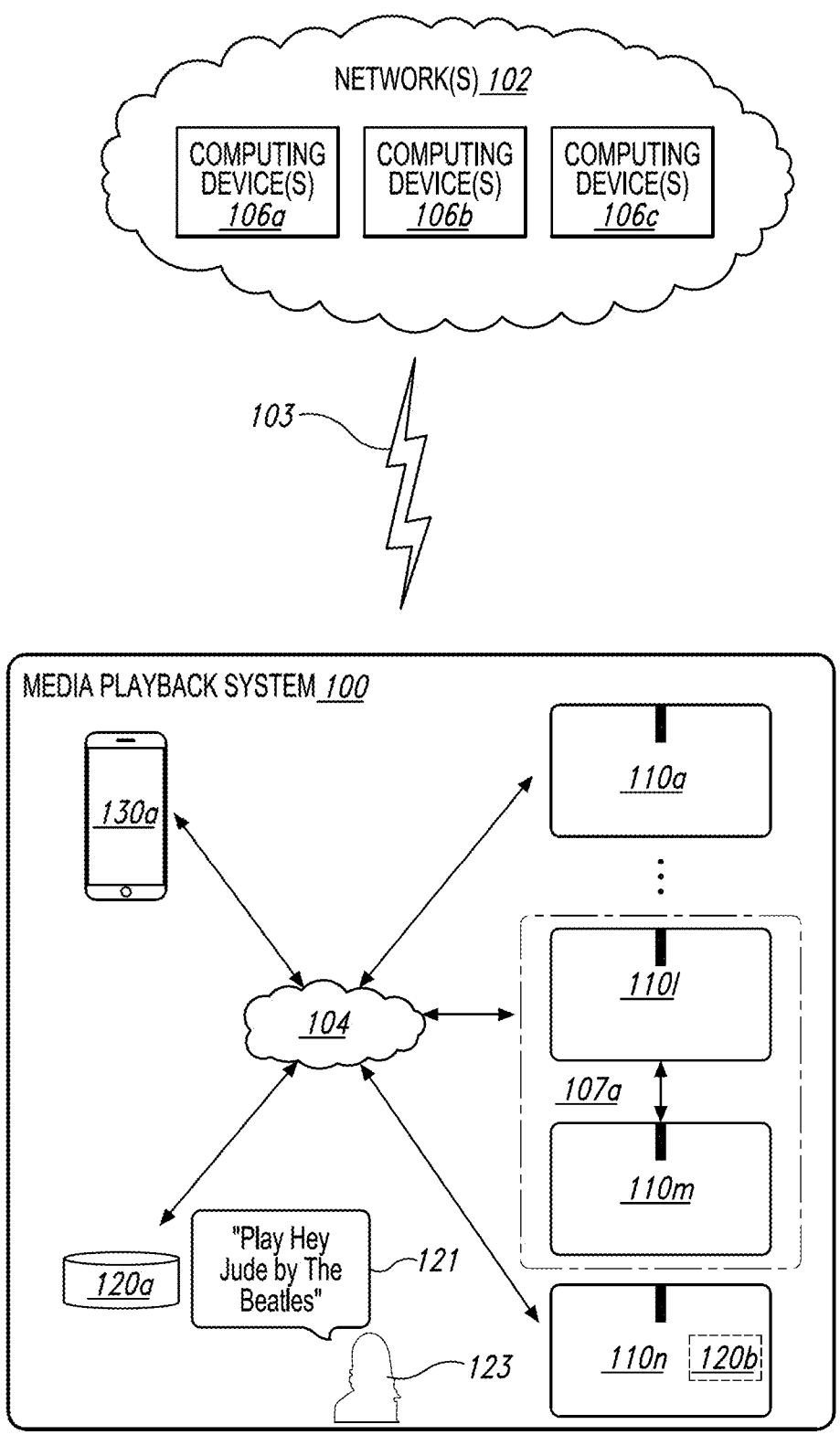
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1I through 1M The media playback system 100 includes the NMDs 120a and 120b, each comprising one or more microphones configured to receive voice utterances from a user. In the illustrated embodiment of FIG. 1B, the NMD 120a is a standalone device and the NMD 120b is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
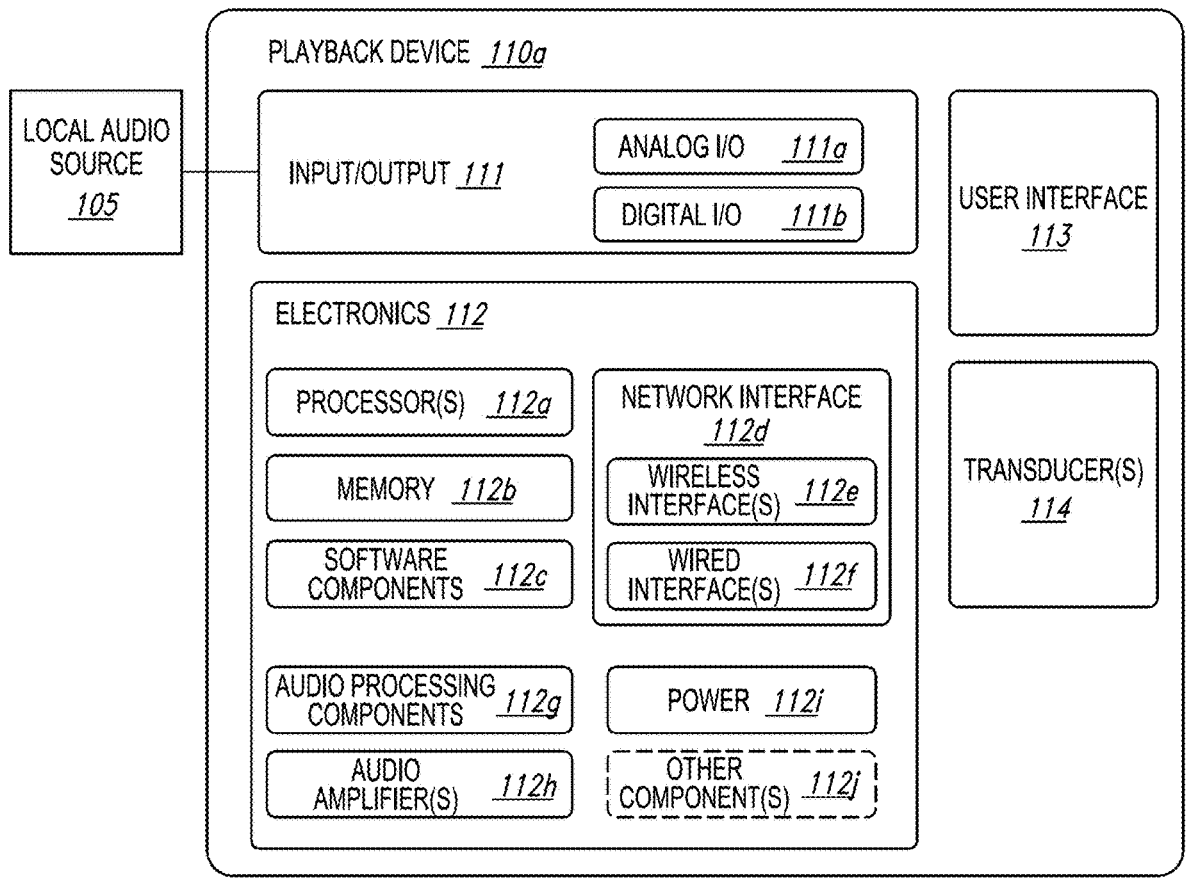
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
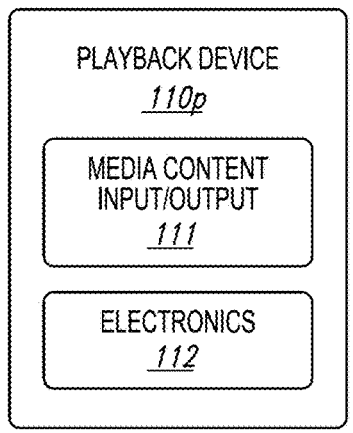
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
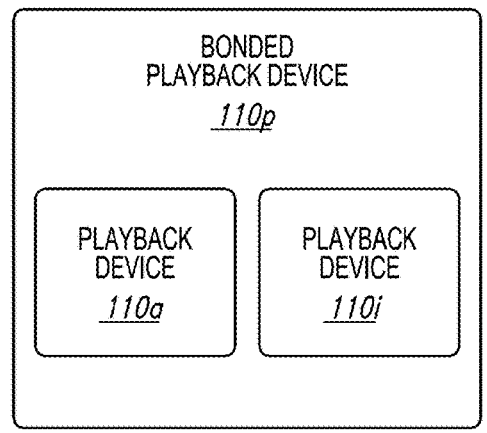
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

e. Suitable Playback Device Configurations

Figure 1M:
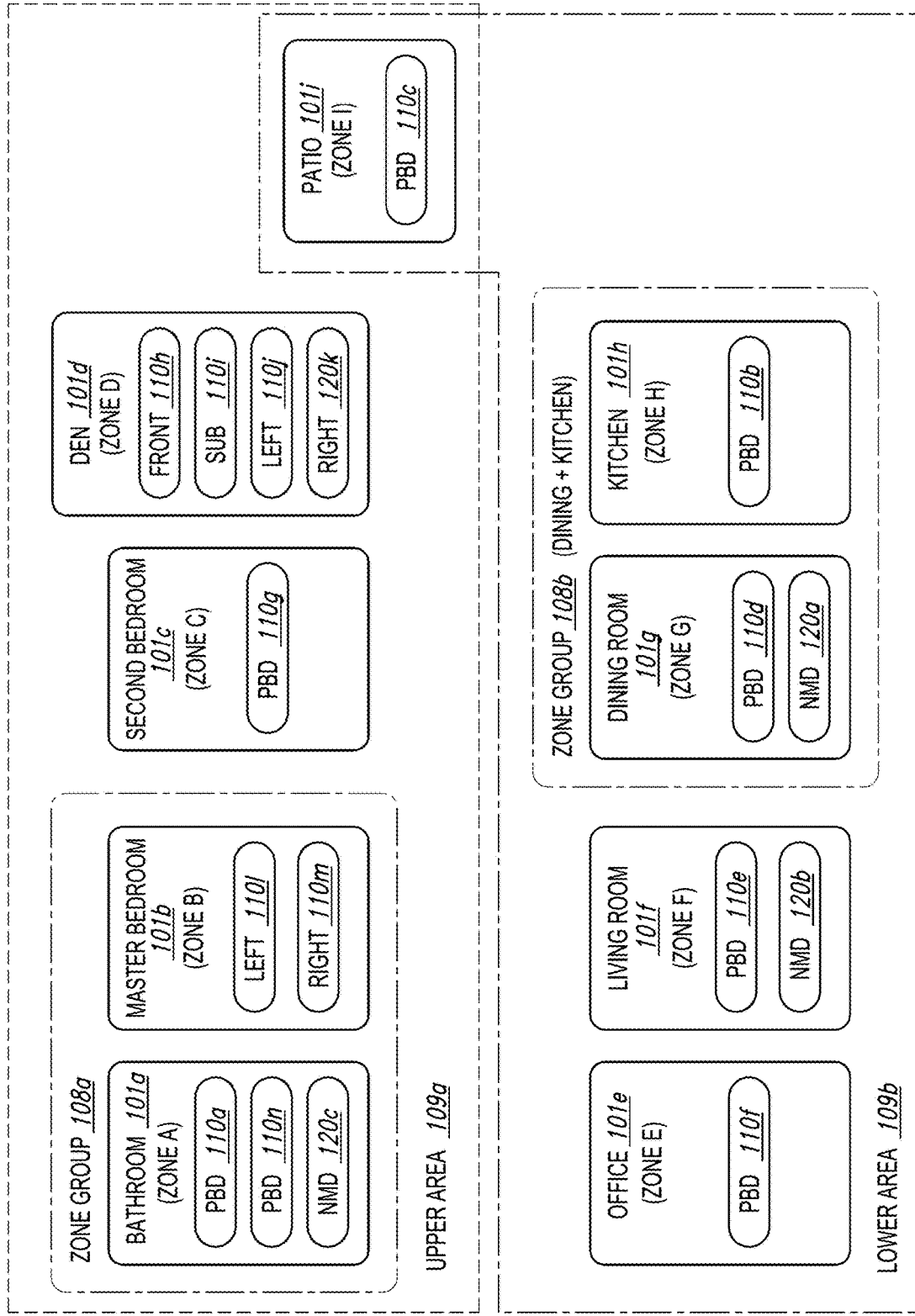
FIG. 1M is a schematic diagram of media playback system areas.

FIGS. 11 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Methods and Devices for Dynamic Selection of Playback Devices

Figure 2A:
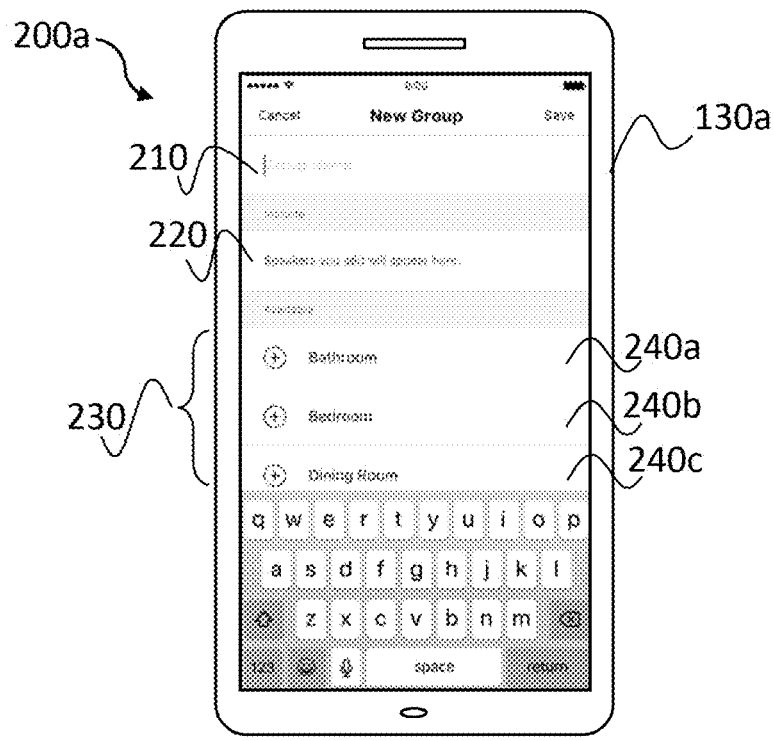
FIG. 2A is a schematic diagram of a control device in the process of creating a group.
Figure 2B:
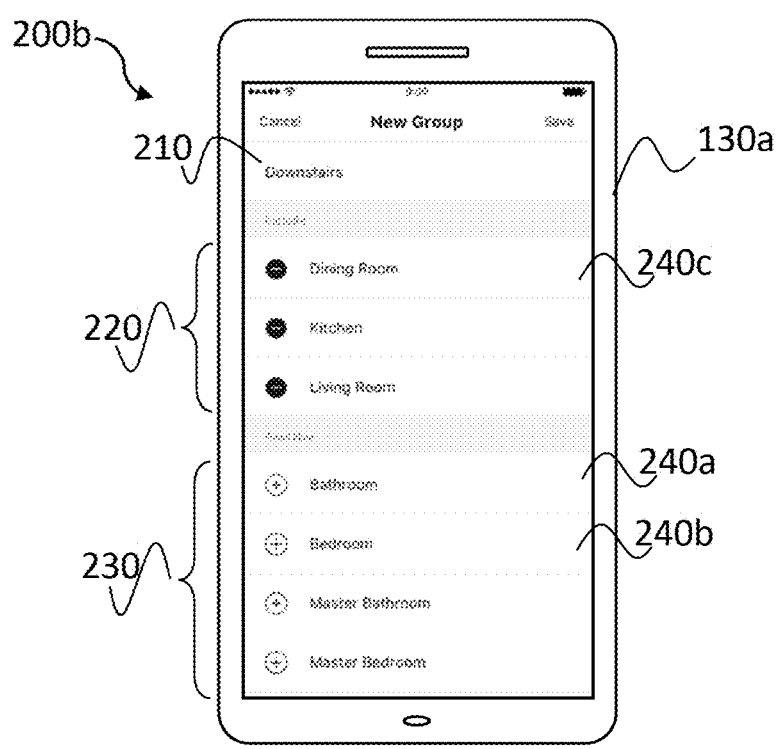
FIG. 2B is a schematic diagram of a control device showing an exemplary group in a media playback system.

According to examples, saved groups of playback devices may be created for use with the playback system. FIGS. 2A and 2B show a schematic view of a control device 130*a* comprising a display for a user interface for the creation of a saved group of playback devices, such as a saved group of playback devices 110 of FIGS. 1A-1M described above.

FIG. 2A shows a saved group creation screen 200*a* through which a user may create a group of playback devices 110 of a media playback system 100. The saved group creation screen 200*a* comprises a plurality of portions, areas or regions 210, 220, 230, for displaying information regarding the media playback system 100 to allow a saved group to be created.

A first portion 210 of the display comprises an input area for a user to enter a group name or other identifier. The group name or identifier can be entered by the user in the first portion 210, for example by using a software keyboard which appears when the user selects the first portion 210. Alternatively, other input devices may be used such as a hardware keyboard, mouse, touch screen, or stylus, for example.

A second portion 220 is provided to display a representation of each playback device which will form part of the saved group. When first creating a new group the second portion 220 of the saved group creation screen 200*a* may contain no representations of playback devices. As shown in FIG. 2A, second portion 220 may include an indication or instruction for prompting a user to select one or more playback devices 110 which form part of the media playback system 100, to add to the group.

A third portion 230 contains one or more representations or user interface elements 240*a*, 240*b*, 240*c* each representative of one or more playback devices 110 of the media playback system. Data of the available playback devices may be obtained or retrieved from storage. For example, the playback devices may be retrieved from memory of the controller device or alternatively they may be retrieved from an external source, such as an internet connected device or server, one or more of the playback devices 110 of the media playback system 100, or another controller device of the media playback system 100. In some examples, data of the available playback devices may also include a name of the playback device to assist identification of particular playback devices by the user.

The representations 240*a*, 240*b*, 240*c* may represent a single playback device 110, or a plurality of playback devices 110 which are bonded. For example, the "Bathroom" representation 240*a*, may be indicative of a single playback device 110*a* in the bathroom 101*a*, as shown in FIG. 1A. In another example, the "Bedroom" representation 240*b* is indicative of two or more playback devices, such as 110*l* and 110*m*, whereby the playback devices 110*l*, 110*m* are bonded together such that they play the same, or different channels of a single audio stream as described above in relation to FIG. 1I. Alternatively or additionally, the representation may be indicative of previously grouped speakers, such as 110*b* and 110*d* as described above in relation to FIG. 1L.

To assign playback devices to a saved group, representations 240*a*, 240*b*, 240*c* in the third portion 230, are selected to add the respective playback devices to the new group. For example, input may be received indicative of a selection, such as a tap in the regions 240*a*, 240*b* or 240*c*. As the user interface elements 240*a*, 240*b*, 240*c* are selected the representation of the playback device is added to the second portion 220 and removed from the third portion 230.

FIG. 2B, shows a saved group creation screen 200*b* at a later stage, once input has been received. A group has been allocated the name "Downstairs" in the first area 210 and has three representations of playback devices in the second portion 220. In this example, the "Dining Room" 240*c*, "Kitchen" and "Living Room" playback devices have been added to the "Downstairs" group. The representations 240*a* and 240*b*, which have not been added to the current group, remain in the third portion. In some examples, input of a selection of a representation in the second portion, such as a tap on the "Dining Room" representation 240*c*, in the second portion 220 removes it from the group. In such, a case the representation is removed from the second portion 220 and added to the third portion 230.

Although FIGS. 2A and 2B show textual representations of playback devices, graphical representations can also be used. Such graphical representations include images or icons of device appearance, environment, primary user (for example the member of the household whose bedroom it is) or any other suitable image. For example, rather than "Dining Room" 240*c*, a table and chairs icon may be used. In other examples combinations of text and graphical representations are used.

Whilst FIG. 2B has been described above in relation to the creation of a new group, the same user interface may be used to edit or otherwise alter and/or delete existing groups within the media playback system 100. For example, the interface 200*b* may be used to change the name of a pre-existing group. Alternatively, or additionally, the interface 200*b* may also be used to change the playback devices 110 which make up the group.

Once playback devices have been selected, the group can be saved. The group may be stored locally in a memory of the controller device 130*a* or in a memory of another device, such as another device of the media playback system 100 or a remote server, such as a cloud server. The group may also be stored in association with user account information representative of the user of the control device. Additional details regarding the synchronization and sharing of properties relating to a media playback system across devices can be found, for example in U.S. patent application Ser. No. 16/030,461 filed Jul. 9, 2018, entitled "Distributed Provisioning of Properties of Operational Settings of a Media Playback System", which is hereby incorporated by reference in its entirety for all purposes.

Figure 3A:
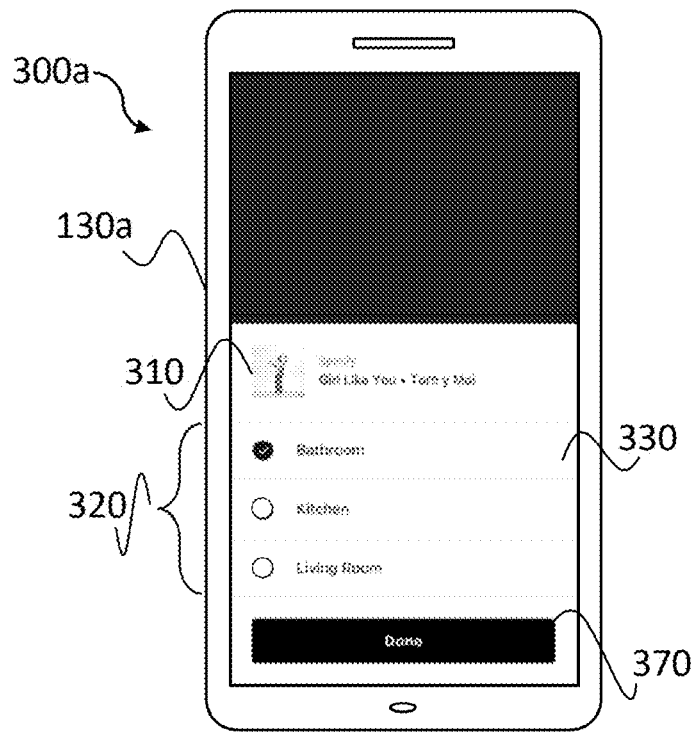
FIG. 3A is a schematic diagram of a control device showing the selection of a room of a media playback system to output a media stream.
Figure 3B:
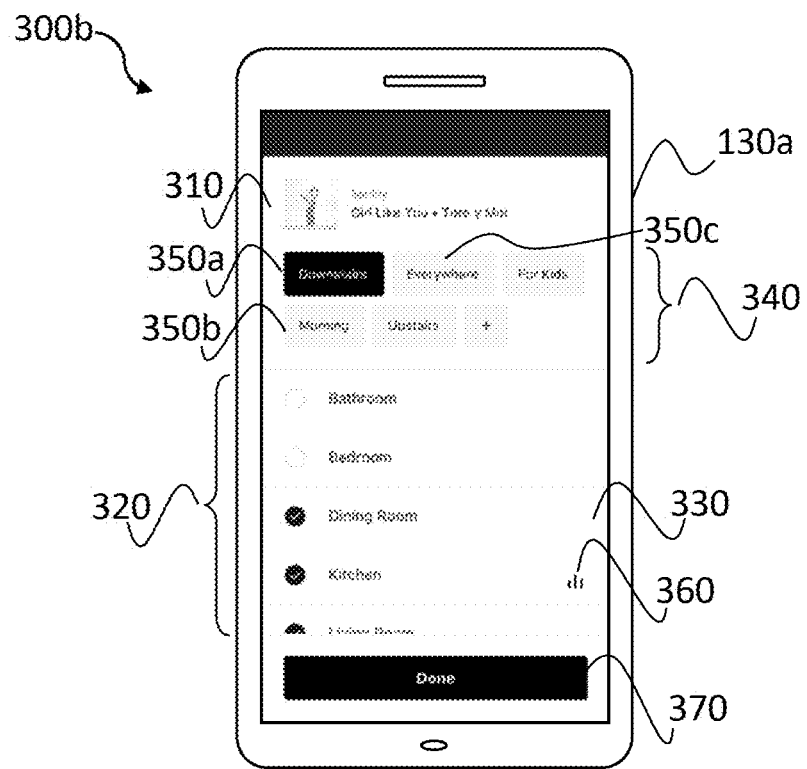
FIG. 3B is a schematic diagram of a control device showing a selection of a group in a media playback system.

Once one or more groups have been saved, they can be used to make subsequent selection of the playback devices more efficient. FIGS. 3A and 3B are schematic diagram of a control device 130a with a display showing a user interface 300a, 300b for the selection of playback devices 110 of a media playback system 100. The user interface can be used for indicating individual playback devices and groups of playback devices for selection. For example, it may allow efficient selection of playback devices 110 to output one or more audio streams to.

FIG. 3A depicts a user interface 300a which allows the selection of individual playback devices 110 and/or bonded playback devices. Each playback device or bonded playback device represents a room in this example. For example, the first 110a and second 110n playback devices in the bathroom 101a, of the media playback system 100 shown in FIG. 1A form a bonded playback device represented as "Bathroom".

The user interface 300a includes a now playing portion 310 for indicating the audio stream to be outputted to the selected playback device(s). The now playing portion 310 may comprise an indication of the song name, source, album artwork and other meta data associated with the audio being outputted to the playback device(s) 110 of the media playback system 100.

The user interface 300a of the control device 130a may also comprise a playback device selection area 320 comprising one or more representations of one or more playback devices 110 available in the media playback system 100. The representations, such as the "Bathroom" representation 330 may be representative of a single playback device 110, or alternatively may be representative of multiple playback devices that are bonded together. As mentioned above with reference to FIG. 2B, the representations may be graphical, textual or a combination of both.

Upon selection of a representation, such as the "Bathroom" representation 330, the selected status may be indicated by a variable in the media playback system 100. For example, the variable may be a binary true/false variable or may be a data structure including data indicative of a playback device in conjunction with data of the selected status. The variables associated with each playback device may be set to be deselected when the user interface 300a is first displayed. In other representations, the selected status may be determined before the display of the representations in the user interface 300a, for example by querying a state variable for current selected status of the playback device. A "selected" status can be indicated in any suitable manner, in FIG. 3A, a selected status is shown by a tick, which a "deselected" status is shown by a blank circle.

One or more of the representations, such as the "Bathroom" representation 330, may be selected to instruct the media playback system 100 to output the audio stream to the playback devices of the selected representation. In some examples, it may be desired to change the playback device(s) that an audio stream is being output to. As such, the user may select or deselect representations accordingly to output the audio stream to the desired playback devices.

FIG. 3B shows a user interface 300b running on a control device 130a, for use when a plurality of groups have been configured, for example as discussed above with reference to FIGS. 2A and 2B. The user interface 300b comprises a now playing portion 310 for indicating the audio stream to be outputted to the selected playback device. The user interface 300b of FIG. 3B also comprises a playback device selection area 320 which provides a list of representations all available playback devices 110 in the media playback system. The representations, such as representation 330 may be textual and/or graphical representations as discussed above, and may be indicative of a single playback device 110, or alternatively, multiple bonded playback devices.

Each representation of a playback device may comprise additional information, for example, giving status information of the playback device. The status information may include an indication 360 that the playback device is currently outputting an audio stream. Status information can be determined from a state variable or data structure representative of the playback system configuration and status which may be requested or received by the control device. Status information can also be determined by requesting information from the playback devices themselves.

The user interface 300b also comprises a group selection portion 340, containing one or more representations of different groups of playback devices 110 of the media playback system 100 which have been previously saved. For example, as described above in relation to FIG. 2B, a "Downstairs" group 350a, may comprise the playback devices represented as "Dining Room", "Kitchen" and "Living Room".

The group selection portion 340 may comprise representations of groups for different purposes. For example, some groups may be representative of a physical layout or physical location, such as the "Downstairs" group 350a. Other groups may be illustrative of a particular scenario or use case, such as "Morning" 350b, which represents playback devices typically used in the morning, such as the bedroom 101b and kitchen 101h. It will be appreciated that other combinations of playback devices and use cases may be used.

The group selection portion 340 also includes a group comprising all the playback devices of the playback system, indicated by "Everywhere" 350c in FIG. 3A. This group comprising all playback devices can be automatically created in some examples. For example, the group may be created automatically when it is determined that the playback system 100 comprises at least three playback devices. This determination could take place when a new playback device is added to the system, for example. Bonded playback devices may be considered to be a single device when configuring the system. In some examples, selection of the group "Everywhere" may group all available playback devices.

A representation of a playback device in the playback device selection area 320 may be selected to output an audio stream to the playback device(s). When it is required to output the audio stream to more than one playback device, more than one of the representations in the playback device selection area 320 can be selected. Multiple playback devices can also be selected using the group selection portion 340, as will be described in more detail below. Selections (and deselections) in the group selection portion 340 are also indicated in the playback device selection area 320. Likewise, selections (and deselections) in the playback device selection area 320 are also indicated in the group selection portion 340.

For example, upon selection of one or more groups 350a, 350b, 350c in the group selection portion 340, the representations of the playback devices which make up the selected group 350*a* are also indicated as selected in the playback device portion 320. As shown in FIG. 3B, the Downstairs group 350*a* is selected in the group selection portion 340, and the playback devices which make up the Downstairs group 350*a* in the playback device selection area 320, are also indicated as selected. Selected groups may be indicated in a different way from selected playback devices. For example, as shown in FIG. 3B, selected groups are indicated by changing a text and background color, while selected playback devices are indicated by an indication (a tick in FIG. 3A) adjacent the representation of the playback device. This different indication of selected status may provide further efficiency of interaction because the distinction between groups and playback devices is clear.

To give some more detail, upon selection of the "Downstairs" group 350*a*, the playback devices which make up the "Downstairs" group are also shown selected. As shown in FIG. 3B the "Dining Room", "Kitchen", and "Living Room". This dual representation can allow simple adjustment of earlier saved groups to fit current circumstances, without requiring the creation of further saved groups. For example, it may be required to select devices downstairs apart from the kitchen. This can be achieved by selecting the "Downstairs" group 350*a* in the group selection area 340 and then deselecting the "Kitchen" playback devices in the playback device selection area 320. This can allow simpler, quicker control—there is no requirement to review a list of all playback devices and identify which are downstairs but not the kitchen. Similarly, groups can be expanded easily. For example, it may be required to select all devices downstairs and the Bedroom playback device. This can be achieved by selecting the "Downstairs" group 350*a* in the group selection area 340 and then selecting the "Bedroom" playback device in the playback device selection area 320.

Within the group selection portion 340 and the playback device selection portion 320, the representations comprise text in this example, and the representations are arranged alphabetically. This can assist locating a particular group or playback device. When purely graphical representations are used, they may be arranged alphabetically according to an associated name or text data which is not displayed. In another example, representations may be displayed in a user defined order, or in an order based on other data, such based on the frequency of selection or based on the total time used for playback.

Whilst not shown in FIG. 3B, the selection of a group in the group selection area 340 may result in a change in the positioning of the representations listed in the playback device selection area 320. For example, if no playback devices in a selected group are visible in the playback device selection area 320, the list displayed in the playback device selection area 320 may be scrolled such that at least one representation of a playback device in the selected group is visible in the playback device selection area. Alternatively, the representations of the playback devices may be rearranged so that the devices in the selected group are at the top of the list. This allows the effect of selecting or deselecting groups to be seen in the playback device selection area and assist understanding that selection of playback devices has also changed. Playback devices corresponding to the group can be identified more easily.

The control device 130*a* may comprise a smartphone (e.g., an iPhone™, an Android phone) or a tablet computer on which media playback system controller application software is installed. A screen of such a device may have a diagonal dimension which is less than or equal to about 18 cm, less than or equal to about 17 cm, less than or equal to about 16 cm, or less than or equal to about 15 cm. The user interface 300*b* allows such a small screen to be used efficiently and ensure that playbacks devices can be selected with relatively few steps. For example, in the case of FIG. 3B, by indicating on the display the playback device(s) which make up the Downstairs group 350*a*, the user is made aware that the audio stream will be provided to the playback devices in the Living Room, Kitchen, and Dining Room, this reduces the amount of interaction a user is required to undertake with the control device. For example, by scrolling to, or rearranging, the selected playback device representations, such as 330, means the user is not required to manually scroll to clarify which playback device(s) make up the selected group.

The group selection portion 340 and playback device selection portion 320 may be of a fixed size or be user resizable and do not overlap. In some examples, the size of the group selection portion 330 may be set to a size sufficient to show all the saved groups in the system, with the playback device selection portion 320 displaying a scrollable list of representations of playback devices if this does not leave enough space to display all the representations of playback devices simultaneously. By displaying all the groups, interaction may be more efficient because a group may be a more effective starting block for the desired devices.

As mentioned above, the user may manually select a plurality of the representations in the playback device selection area 320. If a user selects representations in the playback device selection area 320 which include all the playback devices of one of the previously defined groups, the selection of those playback device representations also results in the selection of the corresponding group being indicated. For example, the "Dining Room", "Kitchen", and "Living Room" representations are selected in the playback device selection area 320, then the "Downstairs" group 350*a* would be indicated as selected. If a user were to then deselect one or more of these representations, the Downstairs group 350*a* would no longer be indicated as selected in the group selection portion 340, as the selected playback devices in the playback device selection area 320 are no longer include all the devices of that group.

A user may, in some examples, select a combination of playback device representations in the playback device selection area 320 which includes the playback devices of more than one group. In this case, all groups which are indicative of the selected playback device representations indicated as selected in the group selection portion 340. For example, a single playback device may be included in more than group. In another example, rather than indicating as selected all possible groups which includes the selected playback devices, a group which is indicative of a majority of the selected playback device representations may be indicated as selected. For example, if all the playback devices are selected, only the "Everywhere" group 350*c* will be indicated as selected. Therefore, as a user selects or deselects playback device representations, the selected/highlighted group is also updated so as to reflect the most relevant groups represented by the selected representations in the playback device selection portion 320.

Once the selection is complete, the selection can be confirmed by an input, such as a tap or click on the "Done" element 370. This may cause the selected playback devices to immediately begin reproduction of the selected media or may store a selected status of the playback devices so that they will begin reproduction when a further command is input to the control device.

Figure 4:
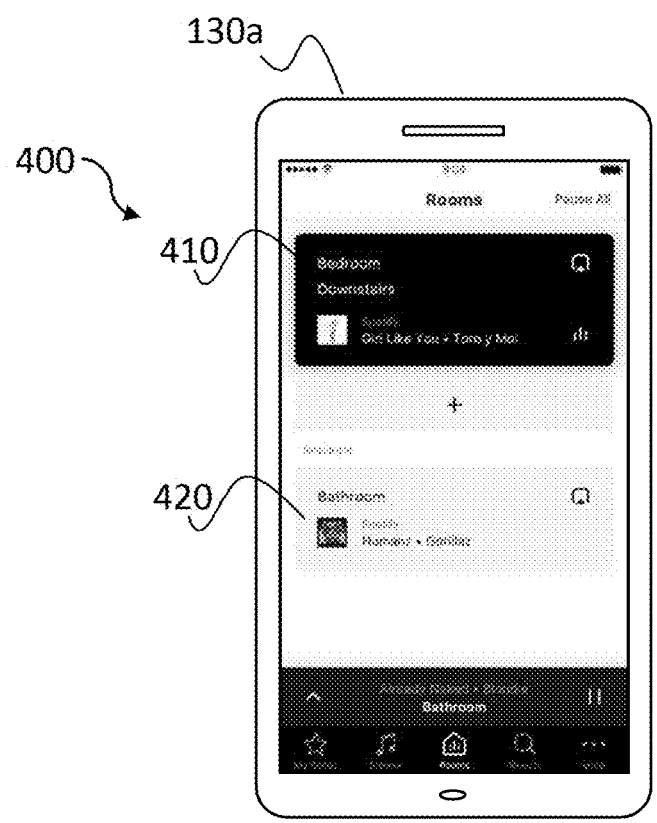
FIG. 4 is a schematic diagram of a control device showing the outputting of a media stream to plurality of playback devices in a media playback system.

FIG. 4 is a schematic diagram of a control device 130a showing a playback screen 400 for indicating the output of a media stream to plurality of selected playback devices. The playback screen 400 comprises a plurality of user interface elements 410, 420 for indicating a current state of the media playback system, such as the media playback system 100 of FIG. 1A. Some user interface elements represent audio streams that are currently being played by one or more groups and/or playback devices in the media playback system. Other user interface elements represent one or more groups and/or playback devices in the media playback system that are inactive, along with information of the audio stream last reproduced by those devices. For example, as shown in FIG. 4, there may be one audio stream currently being played by some of the playback devices the media playback system as indicated by user interface element 410. Similarly, as indicated by user interface element 420, one or more playback devices 110, or groups of the media playback system 100 may be inactive. For example, they may have been previously playing a second audio stream, which has since stopped or been paused. This second audio stream is displayed in user interface element 420. The user interface element 420 may enable restarting the second audio stream to cause it to be reproduced by the playback devices indicated in the user interface element 420. Although two different audio streams and corresponding playback devices are depicted in FIG. 4, there may be more than or less than two audio streams with corresponding playback devices of the media playback system with a corresponding number of user interface elements.

In FIG. 4, a first user interface element 410 indicates a first audio stream being output by the selected playback device, in this case an audio stream from a streaming media service, such as Spotify®. The first user interface element 410 comprises a number of icons and other elements relating to meta data of the audio stream, such as the song name, the artist and the source. The user interface element 410 also comprises an area for indicating the groups and/or playback devices which are currently outputting the audio stream. The indication may be based on the group comprising a majority of the selected playback devices in the group selection portion 340, along with the names of the other playback devices which are not members of that group, for example as discussed above in relation to FIG. 3B.

As shown in FIG. 4 the first user interface element 410 indicates to the user that the audio stream is being output to the "Bedroom" playback device and the "Downstairs" group. In this case the "Bedroom" representation may be indicative of the bonded playback devices 110l and 110m in the Bedroom 101b of FIG. 1A. The "Downstairs" group may be representative of the playback devices 110b, 110d, 110e in the kitchen 101h, dining room 101g, and living room 101f of FIG. 1A. In this way the user can be informed of selected playback devices in a more compact way than simply listing all the devices, allowing better use of the available display space.

In some examples, the selected playback devices may not include all the devices of a group, however they may only differ by a small by number of playback devices, such as one playback device or two playback devices. In such embodiments, the display name may indicate the group and those differing devices that are not selected. For example, this could be indicated by preceding the playback device representations which are not in the group with a "-" sign, with "except", with "not", or by placing the unselected playback devices in parentheses, and so on. For example, if "Dining Room" and "Kitchen" were selected in the playback device selection area 320 of FIG. 3B, the display name may be 'Downstairs—Living Room', "Downstairs except Living Room", "Downstairs not Living Room", or 'Downstairs (Living Room)'.

Alternatively, where only a single playback device representation, or multiple playback device representations which do not form a group have been selected, as shown in the second user interface element 420, the indication provided to the user may be that of the representation names only.

Figure 5A:
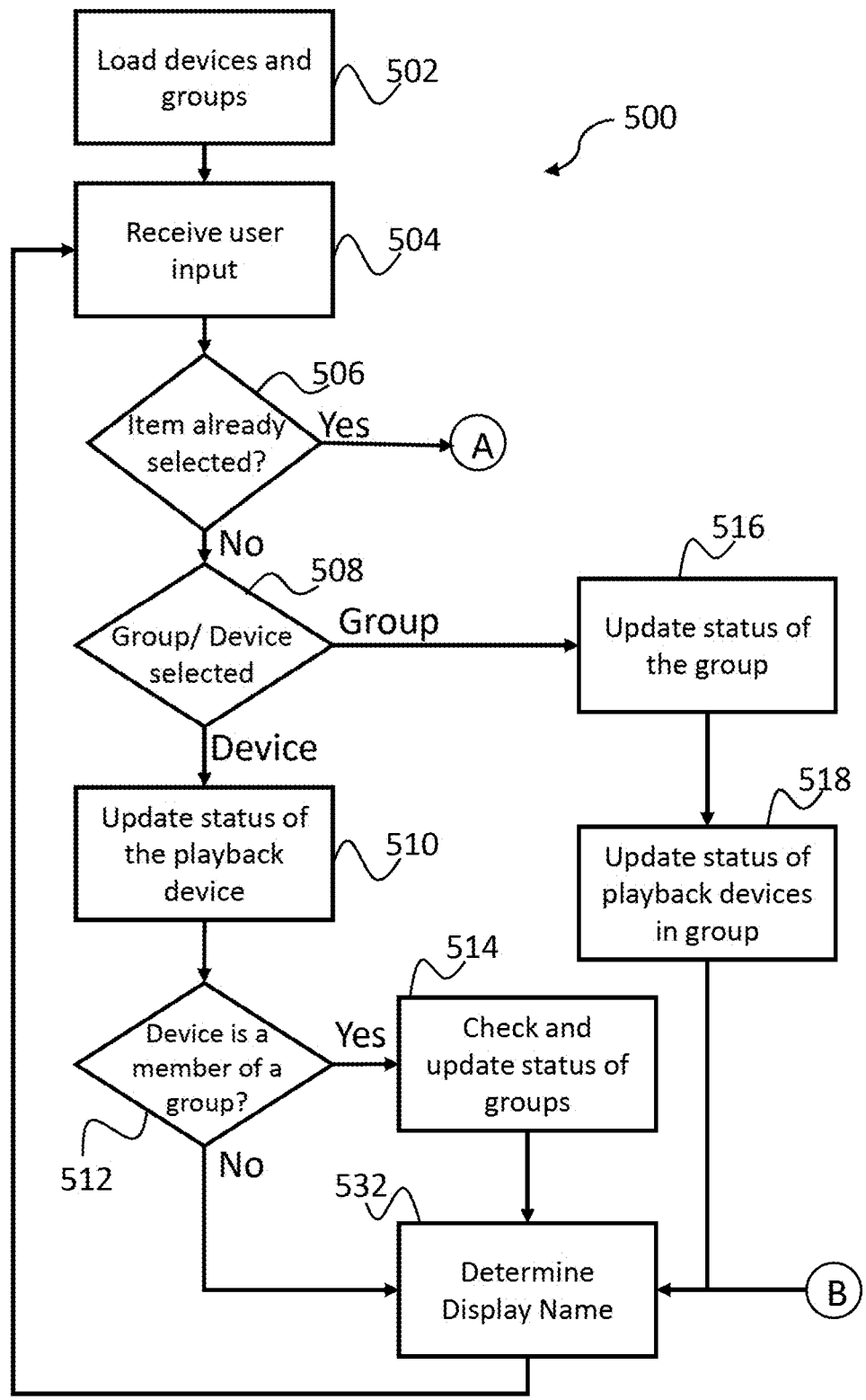
FIGS. 5A and 5B show a flow diagram illustrating a method of selecting and deselecting media playback devices and groups.
Figure 5B:
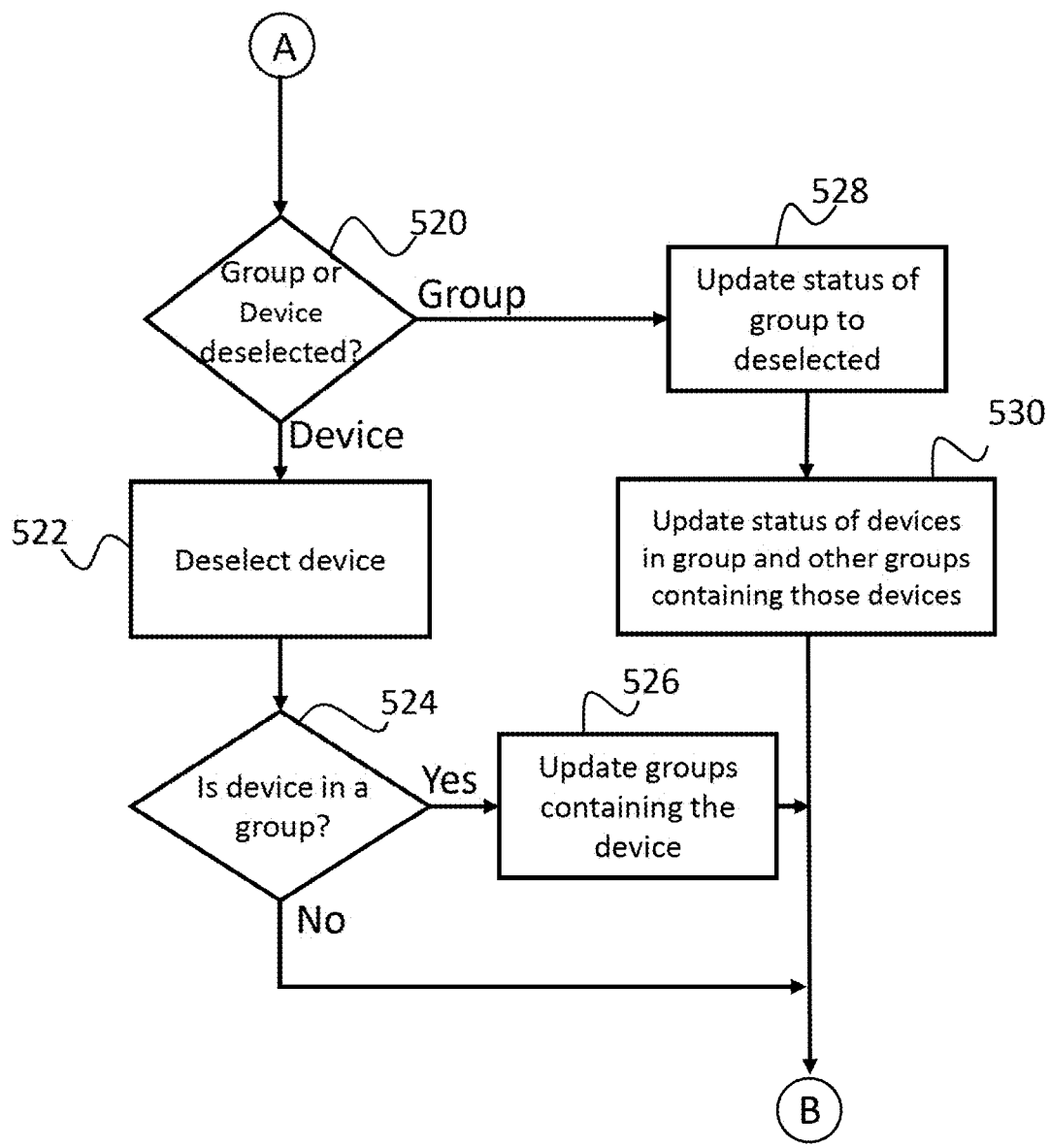

FIGS. 5A and 5B show a flow diagram illustrating a method 500 of selecting and deselecting media playback devices and groups within a media playback system. At item 502, data of the media playback system configuration is loaded into a memory of a controller device, such as controller device 130a described above. The playback system configuration includes information of playback devices in the playback system and groups of playback devices previously set up for the playback system. The data of the playback system configuration may be retrieved from the memory of the controller itself. Alternatively, the data of the playback system configuration may be retrieved or obtained from another memory, such as a memory of the media playback system, a remote server, or another device within the media playback system. Additional details regarding the synchronization and sharing of properties relating to a media playback system across devices can be found, for example in U.S. patent application Ser. No. 16/030,461 filed Jul. 9, 2018, entitled "Distributed Provisioning of Properties of Operational Settings of a Media Playback System", hereby incorporated by reference in its entirety for all purposes. Next, representations of the playback devices are displayed on a first portion of a display of a controller device and the groups are displayed on a second portion of a display of a controller device, for example as described above for FIG. 3B. If any playback devices and/or groups have a status of "selected" this is reflected in the representations on the display. Status may be determined by reading a state variable, for example.

At item 504, an input indicative of a selection of a playback device or a group is received. For example, on a controller device with a touch screen, a selection may be indicated by touching an icon or other user interface element representative of the desired playback device or group.

At item 506, the status of the playback device or group associated with the selection is determined, if it is determined that the associated playback device or group is already selected, the method 500 proceeds to item 520, if not the method 500 proceeds to item 508.

At item 508, it is determined whether the input is indicative of a playback device or a group. If the input is indicative of a playback device, the method proceeds to item 510. If the input is indicative of a group, the method proceeds to item 516.

At item 510, the status of the associated playback device is updated to "selected" and the selection is indicated on the representation of the playback device on the display. As mentioned above, this may involve highlighting the user interface element, repositioning the user interface element or otherwise indicating to the user that the user interface element has been selected. The status may be updated by changing a state variable, for example.

The method 500 then progresses to item 512 where it is determined whether the selected playback device is a member of a previously defined group. For example, it may be checked whether the playback device is associated with any saved groups. The status of all playback devices is determined, such as from a state variable, and compared to previously defined groups. If it is determined that the selected playback device is a member of at least one group, the method 500 progresses to item 514, if not the method 500 progresses to item 532.

At item 514, the status of each of the groups including the selected playback device is checked and updated if necessary. This involves checking the status of all the other playback devices in each group including the selected playback device. If all the playback devices in a group have the status of "selected", then the status of the group is updated to "selected" and the representation of the group is updated to indicate the selection.

Returning to item 508, when it is determined that a group has been selected, the method 500 progresses to item 516 where the status of the group is updated to "selected" and indicated on the representation of the group. Next, at item 518, the playback devices associated with the group are determined and the status of all those playback devices is set to "selected". The representation of those playback devices are then updated to show them as selected if they were not already indicated as selected. The method 500 then progresses to item 532.

Returning to item 506, when it is determined that a playback device or group indicated by the selection has a "selected" status, the method progresses to item 520, where it is determined whether the input is representative of a previously defined group or of a playback device. If the input is representative of a previously defined group, the method 500 progresses to item 528, otherwise if it is representative of a playback device, then the method 500 progresses to item 522.

At item 522, the status of the playback device is updated to "deselected" and the corresponding representation on the display is also updated. Then, at item 524, it is determined whether the deselected playback device was a member of any groups. For example, in FIG. 3B if "Kitchen" was deselected, it would be identified as a member of the "Downstairs" group.

At item 526, any group(s) identified at item 524 have their status updated to deselected, and the representation of those group(s) on the display is updated accordingly. For example, if "Kitchen" was deselected, the "Downstairs" group 350*a* would also be represented as deselected, for example by updating its status to "deselected". Once the representations and statuses have been updated, the method 500 then progresses to item 532.

Returning to item 520, when it is determined that the input is representative of a previously defined group, the method progresses to item 528, where the status of the group is updated to "deselected" and the corresponding representation on the display is also updated. At item 530, the status of the devices which belong to the deselected group are also updated to be "deselected", and the corresponding representation on the display is also updated. For example, with reference to FIG. 3B, if a user were to deselect the "Downstairs" group 350*b*, then the "Kitchen", "Living Room", and "Dining Room" playback devices would have their status set to "deselected" and their representation on the display updated correspondingly. There then follows a further stage of updating, in which any other groups containing the deselected playback devices also have their status set to "deselected" and their representation on the display is updated.

At item 532, based on the groups and devices whose status is "selected", a display name is determined. As described above with reference to FIG. 4, the display name may be representative of a name of the group which contains a majority of the selected playback device representations, along with the name of any other representations which do not form part of that group. For example, referring back to FIG. 3B, if a user selects "Bedroom", "Kitchen", "Dining Room", and "Living Room", in some embodiments, the display name may include the group "Downstairs" and "Bedroom", such as "Downstairs+Bedroom", or "Downstairs and Bedroom". There is no group containing all four selected playback devices, however there is a group, Downstairs which contains a majority, in this case three, of the playback devices, so this group is displayed along with an indication of any changes from that group.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

As discussed above, various methods and apparatus to select playback devices for discussed, for example to allow playback devices to be selected more efficiently. A display includes two portions, one displaying representations of groups of playback devices, and one displaying representations of playback devices. Inputs representative of selections of the groups or playback devices are received, and both portions are updated responsive to the input. In this way selections may be made with fewer inputs or may be made more intuitively. For example, an input selecting or deselecting a particular group is reflected in the representations of the playback devices which make it up. For example, an input selecting or deselecting a particular playback device is reflected in the representations of the groups including the playback device. Following the selection, the selected playback devices may be caused to reproduce media, thereby allowing media to reproduced from multiple playback devices with a small number of inputs, even when the desired playback devices do not correspond to a previously saved group.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A media playback system comprising:
a mobile device; and
a plurality of playback devices configured into multiple sets that include at least one respective playback device,
wherein the mobile device comprises:
a touch-sensitive graphical display;
a first network interface;
at least one first processor; and
at least one first non-transitory computer-readable medium comprising first instructions that are executable by the at least one first processor such that the mobile device is configured to perform first functions comprising:
displaying, via the touch-sensitive graphical display, a first control interface comprising representations of multiple sets;
receiving, via the first control interface on the touch-sensitive graphical display, first input data representing a command to designate a first set and a second set of the multiple sets as a particular pre-saved group, wherein the first set comprises at least one first playback device of the plurality of playback devices and the second set comprises at least one second playback device of the plurality of playback devices;
based on receiving the first input data, causing storage of pre-saved group data representing the particular pre-saved group;
after causing storage of pre-saved group data representing the particular pre-saved group, displaying, via the touch-sensitive graphical display, a second control interface comprising selectable representations of playback targets, the playback targets including the multiple sets and the particular pre-saved group, wherein the selectable representations comprise a first selectable representation in a first region of the second control interface and second selectable representations in a second region of the second control interface that does not overlap the first region, the first selectable representation representing the particular pre-saved group and the second selectable representations representing respective sets of the multiple sets;
receiving, via the second control interface on the touch-sensitive graphical display, second input data representing a command to select the particular pre-saved group as a playback target; and
based on receiving the second input data: (i) sending, via the first network interface to the plurality of playback devices, instructions to form a particular synchrony group including the at least one first playback device and the at least one second playback device, (ii) modifying the first selectable representation on the second control interface to indicate that the particular pre-saved group is selected and (iii) modifying two particular second selectable representations to indicate that the first set and the second set are selected,
and wherein the plurality of playback devices comprises:
a second network interface;
at least one second processor; and
at least one second non-transitory computer-readable medium comprising second instructions that are executable by the at least one second processor such that the plurality of playback devices is configured to perform second functions comprising:
receiving, via the second network interface, the instructions to form the particular synchrony group;
after receiving the instructions to form the particular synchrony group, forming the particular synchrony group; and
while the particular synchrony group is formed, playing back audio content in synchrony via the at least one first playback device and the at least one second playback device.

2. The media playback system of claim 1, wherein causing storage of the pre-saved group data representing the particular pre-saved group comprises sending, via the first network interface, instructions to save the pre-saved group data representing the particular pre-saved group; and wherein the second functions further comprise:
storing, in data storage of the plurality of playback devices, the pre-saved group data representing the particular pre-saved group.

3. The media playback system of claim 2, wherein each playback device of the plurality of playback devices comprises respective data storage, and wherein storing the pre-saved group data representing the particular pre-saved group comprises:
storing, in data storage of multiple playback devices, state data representing the pre-saved group data representing the particular pre-saved group.

4. The media playback system of claim 2, wherein the media playback system comprises an additional mobile device, wherein the additional mobile device comprises:
an additional touch-sensitive graphical display;
an additional network interface;
at least one additional processor; and
at least one additional non-transitory computer-readable medium comprising additional instructions that are executable by the at least one additional processor such that the additional mobile device is configured to perform additional functions comprising:
displaying, via the additional touch-sensitive graphical display, the first control interface comprising representations of the multiple sets;
receiving, via the first control interface on the additional touch-sensitive graphical display, input data representing a command to designate the first set and a third set of the multiple sets as an additional pre-saved group, wherein the third set comprises at least one third playback device of the plurality of playback devices;

based on receiving the input data representing a command to designate the first set and the third set of the multiple sets as the additional pre-saved group, causing storage of updated pre-saved group data representing the additional pre-saved group; and after causing storage of the updated pre-saved group data representing the additional pre-saved group, displaying via the touch-sensitive graphical display, an additional control interface comprising selectable representations of updated playback targets, the updated playback targets including the multiple sets, the particular pre-saved group, and the additional pre-saved group.

5. The media playback system of claim 1, wherein the first functions further comprise:

while the particular pre-saved group is selected as the playback target, receiving, via the second control interface on the touch-sensitive graphical display, third input data representing a command to select an additional set as an additional playback target, wherein the additional set comprise at least one additional playback device of the plurality of playback devices; and based on receiving the third input data, sending, via the first network interface to the plurality of playback devices, instructions to add the at least one additional playback device to the particular synchrony group including the at least one first playback device and the at least one second playback device.

6. The media playback system of claim 1, wherein forming the particular synchrony group comprises:

removing the second set from an additional synchrony group.

7. The media playback system of claim 1, wherein the first selectable representation comprises a name of the particular pre-saved group, and wherein modifying the first selectable representation on the second control interface to indicate that the particular pre-saved group is selected comprises:

modifying text color of the name and background color of the first selectable representation on the second control interface.

8. The media playback system of claim 7, wherein the two particular second selectable representations comprise respective names of the first set and the second set, and wherein modifying the two particular second selectable representations to indicate that the first set and the second set are selected comprises:

modifying text color of the respective names and background colors of the two particular second selectable representations on the second control interface.

9. The media playback system of claim 1, wherein the plurality of playback devices are connected to a local area network, and wherein sending, via the first network interface to the plurality of playback devices, the instructions to form the particular synchrony group comprises:

sending, via the first network interface over the local area network to the plurality of playback devices, the instructions to form the particular synchrony group.

10. The media playback system of claim 9, wherein the first functions further comprise:

identifying, via the first network interface, playback devices that are connected to the local area network; and wherein displaying, via the touch-sensitive graphical display, the first control interface comprising representations of the multiple sets comprises:

displaying representations of a particular plurality of sets that are configured to include the identified playback devices that are connected to the local area network.

11. The media playback system of claim 9, wherein displaying, via the touch-sensitive graphical display, the second control interface comprises:

displaying the selectable representations of the playback targets in a list.

12. A mobile device of a media playback system, the mobile device comprising:

a touch-sensitive graphical display;

a network interface;

at least one processor; and at least one non-transitory computer-readable medium comprising instructions that are executable by the at least one processor such that the mobile device is configured to:

display, via the touch-sensitive graphical display, a first control interface comprising representations of multiple sets that include at least one respective playback device, wherein the media playback system comprises the mobile device and a plurality of playback devices configured into the multiple sets;

receive, via the first control interface on the touch-sensitive graphical display, first input data representing a command to designate a first set and a second set of the multiple sets as a particular pre-saved group, wherein the first set comprises at least one first playback device of the plurality of playback devices and the second set comprises at least one second playback device of the plurality of playback devices;

based on receipt of the first input data, cause storage of pre-saved group data representing the particular pre-saved group;

after the pre-saved group data representing the particular pre-saved group is stored, display, via the touch-sensitive graphical display, a second control interface comprising selectable representations of playback targets, the playback targets including the multiple sets and the particular pre-saved group, wherein the selectable representations comprise a first selectable representation in a first region of the second control interface and second selectable representations in a second region of the second control interface that does not overlap the first region, the first selectable representation representing the particular pre-saved group and the second selectable representations representing respective sets of the multiple sets;

receive, via the second control interface on the touch-sensitive graphical display, second input data representing a command to select the particular pre-saved group as a playback target;

based on receipt of the second input data: (i) send, via the network interface to the plurality of playback devices, instructions to form a particular synchrony group including the at least one first playback device and the at least one second playback device, (ii) modify the first selectable representation on the second control interface to indicate that the particular pre-saved group is selected and (iii) modify two particular second selectable representations to indicate that the first set and the second set are selected; and while the particular synchrony group is formed, cause the particular synchrony group to play back audio content in synchrony via the at least one first playback device and the at least one second playback device.

13. The mobile device of claim 12, wherein the at least one non-transitory computer-readable medium further comprises instructions that are executable by the at least one processor such that the mobile device is configured to:
while the particular pre-saved group is selected as the playback target, receive, via the second control interface on the touch-sensitive graphical display, third input data representing a command to select an additional set as an additional playback target, wherein the additional set comprises at least one additional playback device of the plurality of playback devices; and
based on receiving the third input data, sending, via the network interface to the plurality of playback devices, instructions to add the at least one additional playback device to the particular synchrony group including the at least one first playback device and the at least one second playback device.

14. The mobile device of claim 12, wherein the first selectable representation comprises a name of the particular pre-saved group, and wherein the instructions that are executable by the at least one processor such that the mobile device is configured to modify the first selectable representation on the second control interface to indicate that the particular pre-saved group is selected comprise instructions that are executable by the at least one processor such that the mobile device is configured to:
modify text color of the name and background color of the first selectable representation on the second control interface.

15. The media playback system of claim 14, wherein the two particular second selectable representations comprise respective names of the first set and the second set, and wherein the instructions that are executable by the at least one processor such that the mobile device is configured to modify the two particular second selectable representations to indicate that the first set and the second set are selected comprise instructions that are executable by the at least one processor such that the mobile device is configured to:
modify text color of the respective names and background colors of the two particular second selectable representations on the second control interface.

16. A tangible, non-transitory computer-readable medium comprising instructions that are executable by at least one processor such that a mobile device of a media playback system is configured to:
display, via a touch-sensitive graphical display, a first control interface comprising representations of multiple sets that include at least one respective playback device, wherein the media playback system comprises the mobile device and a plurality of playback devices configured into the multiple sets;
receive, via the first control interface on the touch-sensitive graphical display, first input data representing a command to designate a first set and a second set of the multiple sets as a particular pre-saved group, wherein the first set comprises at least one first playback device of the plurality of playback devices and the second set comprises at least one second playback device of the plurality of playback devices;
based on receipt of the first input data, cause storage of pre-saved group data representing the particular pre-saved group;
after the pre-saved group data representing the particular pre-saved group is stored, display, via the touch-sensitive graphical display, a second control interface comprising selectable representations of playback targets, the playback targets including the multiple sets and the particular pre-saved group, wherein the selectable representations comprise a first selectable representation in a first region of the second control interface and second selectable representations in a second region of the second control interface that does not overlap the first region, the first selectable representation representing the particular pre-saved group and the second selectable representations representing respective sets of the multiple sets;
receive, via the second control interface on the touch-sensitive graphical display, second input data representing a command to select the particular pre-saved group as a playback target;
based on receipt of the second input data: (i) send, via a network interface to the plurality of playback devices, instructions to form a particular synchrony group including the at least one first playback device and the at least one second playback device, (ii) modify the first selectable representation on the second control interface to indicate that the particular pre-saved group is selected and (iii) modify two particular second selectable representations to indicate that the first set and the second set are selected; and
while the particular synchrony group is formed, cause the particular synchrony group to play back audio content in synchrony via the at least one first playback device and the at least one second playback device.

17. The tangible, non-transitory computer-readable medium of claim 16, wherein the first selectable representation comprises a name of the particular pre-saved group, and wherein modifying the first selectable representation on the second control interface to indicate that the particular pre-saved group is selected comprises:
modifying text color of the name and background color of the first selectable representation on the second control interface.

18. The tangible, non-transitory computer-readable medium of claim 17, wherein the two particular second selectable representations comprise respective names of the first set and the second set, and wherein modifying the two particular second selectable representations to indicate that the first set and the second set are selected comprises:
modifying text color of the respective names and background colors of the two particular second selectable representations on the second control interface.

* * * * *

UNITED STATES PATENT AND TRADEMARK OFFICE
CERTIFICATE OF CORRECTION

PATENT NO. : 12,026,363 B2
APPLICATION NO. : 18/050629
DATED : July 2, 2024
INVENTOR(S) : Kitson et al.

Page 1 of 1

It is certified that error appears in the above-identified patent and that said Letters Patent is hereby corrected as shown below:

In the Claims

In Column 33, in Claim 15, Line 30, delete "media playback system" and insert -- mobile device --, therefor.

Signed and Sealed this
Twentieth Day of August, 2024

Katherine Kelly Vidal
Director of the United States Patent and Trademark Office